Nov. 8, 1960   V. F. DE VOST   2,959,460
MECHANICAL SHOCK RECORDER
Filed Oct. 15, 1958

INVENTOR.
VALMORE F. DE VOST

BY
ATTORNEYS

United States Patent Office 2,959,460
Patented Nov. 8, 1960

2,959,460

MECHANICAL SHOCK RECORDER

Valmore F. De Vost, Silver Spring, Md., assignor to the United States of America as represented by the Secretary of the Navy Filed Oct. 15, 1958, Ser. No. 767,492

1 Claim. (Cl. 346—7)

(Granted under Title 35, U.S. Code (1952), sec. 266)

The invention described herein may be manufactured and used by or for the Government of the United States of America for governmental purposes without the payment of any royalties thereon or therefor.

This invention relates to a mechanical shock recorder and more particularly to a shock recorder employing mechanical means for sensing and recording a shock received by an object under test by a body such as a high velocity ordnance device upon target impact.

Various shock testers and shock recording devices have been devised heretofore. Such devices comprise various types of accelerometers such, for example, as unbonded, crystal, or mechanical types of accelerometers and accelerometers of the copper-ball type. These types of accelerometers have in general proven to be more or less satisfactory under subsonic conditions of test but with the event of supersonic ordnance accurate shock information has become critical particularly in those cases where the characteristics of the shock signature are recorded. In certain cases, recordation has been obtained by means of trailing cables or through the use of telemetering. Experience with trailing cables, however, has shown the marginal velocity for trouble-free operation to be around 500 feet per second and at free-fall drop heights of over 100 feet trailing cables have proved to be impractical.

The device of the instant invention possesses all of the advantages of the prior art devices and none of the foregoing disadvantages.

In accordance with the present invention the shock signature is obtained by deformation of a resilient roller in response to an impact applied thereto by a heavy metallic roller as the high intensity shock is received. The rollers are so configured that the width of the surface of contact therebetween is increased in an axial direction in proportion to the intensity of the shock, a record of this condition being made on one of the rollers or, if desired, upon a moving tape or chart interposed therebetween with which the rollers are normally in contact, the record being made while the rollers are revolving continuously about a pair of horizontal axes respectively as will more clearly appear as the description proceeds.

One of the objects of the present invention is to provide a new and improved shock tester and recorder in which the shock signature is correlative with the width of the trace formed on a moving chart.

Another object is to provide a shock tester and recorder for a high G ordnance device having new and improved means for recording the duration and intensity of the shock received by the device in response to deformation of one of the recording elements as the shock is received.

Still another object is the provision of a new and improved shock tester and recorder in which the shock deformation of one of the recording elements thereof is amplified and recorded on a moving chart.

Still other objects, advantages and improvements will be apparent from the following description taken in connection with the accompanying drawings on which:

Figure 1:
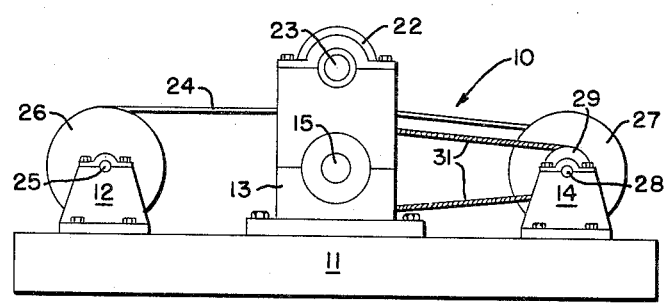
Fig. 1 is a view in elevation of the shock sensing and recording device of the instant invention according to a preferred embodiment thereof.
Figure 2:
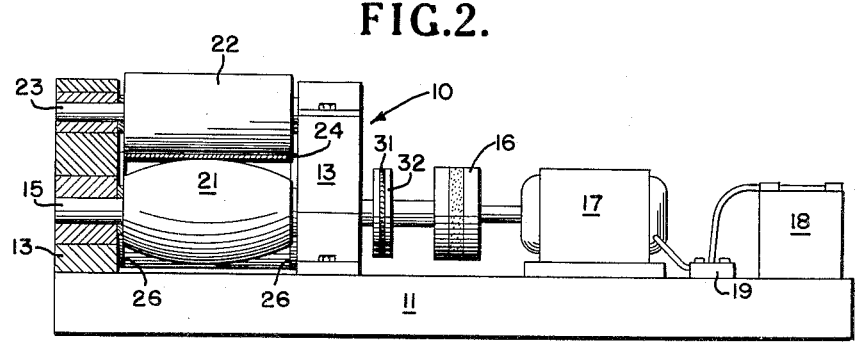
Fig. 2 is an end view partially in section of the device of Fig. 1.

Referring now to the drawing on which like numerals of reference are employed to designate like parts throughout the several views and more particularly to Fig. 1 thereof there is shown thereon a shock testing and recording device in accordance with the present invention and indicated generally by the numeral 10. The device comprises a base 11 to which is affixed in any suitable manner as by the bolts illustrated a plurality of supports 12, 13 and 14. Supported on the supports 13 for rotative movement is a shaft 15 coupled by a flexible coupling 16 to a motor 17. In the illustrated embodiment of the invention the motor 17 is electrical and adapted to be operated by power received from battery 18 upon closure of switch 19. Secured to the shaft 15 in any convenient manner is a generally elliptical shaped roller 21 composed of resilient material such, for example, as rubber adapted to be engaged by a roller 22 of cylindrical configuration carried by shaft 23 journalled within supports 13 and normally in engagement with the elliptical roller 21 at the mid portion thereof or in engagement with a strip of paper tape or chart 24 disposed between the rollers 21 and 22. Roller 22 is composed of metal suitable for the purpose such, for example, as steel. Shafts 15 and 23 are each disposed horizontally in a vertical plane with shaft 23 above shaft 15 and of less rigidity than shaft 15. An arrangement is thus provided in which both rollers 21 and 22 rotate simultaneously in opposite directions by motor 17 as the motor operates.

On support 12 is pivotally mounted as at 25 a reel 26 having a length of tape 24 wrapped thereabout, the tape continuing past rollers 21 and 22 to a receiving reel 27 mounted on shaft 28 for pivotal movement within a pair of journals on the supports 14 and having a coiled spring type belt 31 engaged thereby, the belt also passing over a driving pulley 32 secured to shaft 15. An arrangement is thus provided in which the receiving reel 27 is driven by pulley 32 in such manner as to receive the tape 24 after it has passed between rollers 21 and 22, the rate of movement of the tape being controlled by the peripheral rate of movement of roller 21 in contact therewith.

Figure 3:
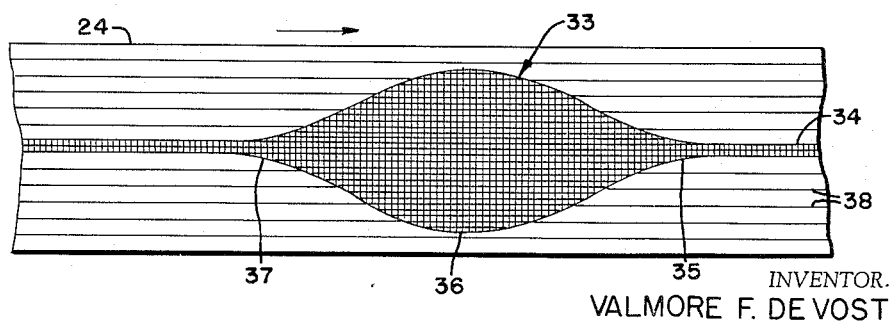
Fig. 3 is a length of tape or chart having a shock recording thereon obtained from the device of Fig. 1.

Referring now to Fig. 3, there is shown thereon a length of tape 24 moveable through the device of Fig. 1 in the direction indicated by the arrow and having thereon a shock signature indicated generally by numeral 33. When no shock signature is received the tape has a marking thereon as at 34 of uniform narrow cross sectional dimension and as the shock is received at 35 the width of this trace increases until at 36 the shock has attained a maximum value and thereafter diminishes in strength until the point 37 is reached at which point the shock has subsided. The time of duration of the shock is made manifest by the distance on the tape between points 35 and 37 of the shock signature. This time may be readily converted to fractional parts of a second by consideration of the effective diameter of roller 21 and the rate of rotation of shaft 15.

The roller 21 is composed of rubber or any of the synthetic varieties thereof suitable for the purpose and coated with printing ink and as the shock is received the roller 21 is deformed momentarily sufficiently to increase the width of the ink marking on the tape 24 as shown in Fig. 3.

Although the invention has been described with reference to a roller 22 of hard metal such as steel and roller 21 composed of resilient material, it will be noted that, if desired, roller 21 may be composed of steel or the like and roller 22 made of resilient material and further, if desired, the coating of ink may be applied to either of the rollers, as desired, without departing from the present invention. Furthermore, the contour of roller 21 although shown for the purpose of description as generally elliptical may, if desired, be of other configuration such, for example, as frusto-conical with the bases of two frusto-conical cones in abutting relation at the center portion thereof, it being merely necessary to provide a configuration such that the width of the trace 34 is increased in response to deformation of one of the rollers as a shock is received.

The intensity of the shock is proportional to the axial or transverse spread of the trace 34 and may be measured by reference to a previously calibrated trace associated with a shock of known strength or by reference to a plurality of longitudinal lines printed on the tape correlative with previously calibrated values of shock and indicated generally by the numeral 38.

Furthermore, although the device of Fig. 1 has been shown as being operated by an electric motor, it will be understood that, if desired, a spring motor may be employed in lieu thereof and a speed regulating device such as a governor, not shown, may be connected thereto to obtain uniform rotation of shaft 15.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

A shock tester and recorder for recording the intensity and duration of a shock received thereby, comprising a rotatable element of circular cross-section and of longitudinal elliptical configuration, a first horizontally disposed shaft concentric with said element for supporting the element for rotation about the axis thereof, means for rotating said first shaft at a uniform rate of rotation, a second circular element of cylindrical configuration mounted for rotation about an axis above and parallel to said shaft and in normal contact with the first element at the enlarged circular portion thereof and driven by the first element for rotation in a direction opposite to the rotation of the first element, a second horizontally disposed shaft concentric with said second element for supporting said second element for rotation about the axis thereof, said second shaft having less rigidity than said first shaft, said second element being metal and said first element being deformable rubber whereby the line of contact between the elements parallel to said shaft increases in proportion to the pressure applied to the first element by the second element in response to a shock received by the device, a coating of ink applied uniformly to one of said elements to record the intensity and duration of said shock upon the other of said elements as the shock is received, means for rotating said first element at a constant rate of rotation while the shock is being received, a moveable chart disposed between said elements and moveable thereby for recording the signature of the shock received as said first element is deformed, said chart including a plurality of reference lines arranged longitudinally thereon for indicating the magnitude of the shock recorded thereby, and winding and reeling means for feeding a length of said chart between said elements.

References Cited in the file of this patent
UNITED STATES PATENTS

| | | |
|---|---|---|
| 1,519,473 | Zahn | Dec. 16, 1924 |
| 2,341,652 | Rey | Feb. 15, 1944 |
| 2,349,699 | Boor | May 23, 1944 |
| 2,721,071 | Kempton | Oct. 18, 1955 |
| 2,838,358 | Wattles | June 10, 1958 |